Figure 1:
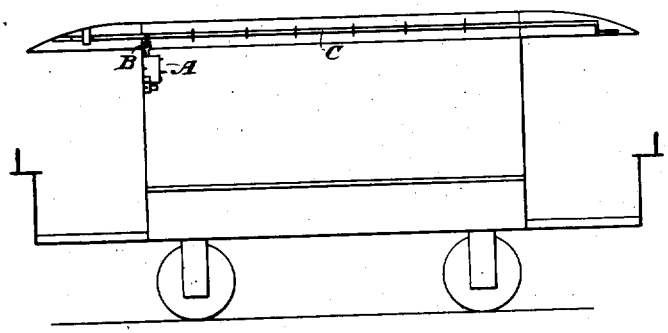

2 Sheets—Sheet 1.

J. B. BENTON,

Assignor, by mesne assignments, to THE RAILWAY REGISTER MANUFACTURING COMPANY.

Passenger Register.

No. 9,313. Reissued July 20, 1880.

INVENTOR

John B. Benton.

WITNESSES

Wm A Skinkle

R. F. Barnes.

By his Attorneys

Baldwin, Hopkins & Peyton.

2 Sheets—Sheet 2.

J. B. BENTON,

Assignor, by mesne assignments, to THE RAILWAY REGISTER MANUFACTURING COMPANY.

Passenger Register.

No. 9,313. Reissued July 20, 1880.

WITNESSES

Wm. A. Skinkle.

R. F. Barnes.

INVENTOR

John B. Benton.

By his Attorneys

Baldwin, Hopkins & Peyton.

UNITED STATES PATENT OFFICE.

JOHN B. BENTON, OF NEW YORK, ASSIGNOR, BY MESNE ASSIGNMENT, TO THE RAILWAY REGISTER MANUFACTURING COMPANY, OF BUFFALO, NEW YORK.

PASSENGER-REGISTER.

SPECIFICATION forming part of Reissued Letters Patent No. 9,313, dated July 20, 1880.

Original No. 167,057, dated August 24, 1875. Application for reissue filed January 28, 1880.

DIVISION B.

*To all whom it may concern:*

Be it known that I, JOHN B. BENTON, civil engineer, of the city, county, and State of New York, have invented certain new and useful Improvements in Passenger or Fare Registers; and I do hereby declare the following to be a full, clear, and exact description thereof, reference being had to the accompanying drawings, making part of this specification.

My present invention relates more especially to an improved method of operating a stationary fare-register secured firmly in place in a car or vehicle, so as to be in full view of the passengers from all parts of such car or vehicle in which a fare may be collected.

Street-cars are so often crowded that it becomes difficult for a detective to keep a record of the passengers getting in and out, and unless the registering device is so arranged that the conductor can and shall be compelled to register each and every fare directly after the same has been collected and before another has been accepted, the machine loses in a great measure its value as a monitor over the conductor's honesty, and is not an absolute check by which to prevent dishonest practices or peculations by false returns of collections made.

Heretofore there have been two ways of compelling a registration at the time of collection of each fare, one way being to render the fare-register portable and suspend it from the person of the conductor, so that failure to register the fare when collected is apparent to the passenger and the dishonesty of the collector soon brought to the knowledge of the proprietor or company to whom he is responsible, while the other way is to secure the registering apparatus at one end of the car and connect with the lever, slide, or actuator that operates it a strap extending overhead throughout the length of the car, whereby, when a fare is collected at any point in the car, the conductor can, as soon as the collection is made, operate the register and audibly announce the registration by pulling upon the strap.

One of the principal objections to the use of a mere overhead strap or cord by which to actuate a stationary register is its liability to mischievous, malicious, or accidental manipulation or injury by the passengers.

The object of my present invention is to enable the conductor to readily, positively, and easily operate a stationary fare-register from all parts of a car or vehicle, without danger of accidental or mischievous operations or interference from the passengers, by means of connections extending throughout the car or vehicle, my invention consisting of certain new organizations and combinations of a fare-register, with its actuating-connections, which are ~~c~~ set forth at the close of this specification.

Figure 2:
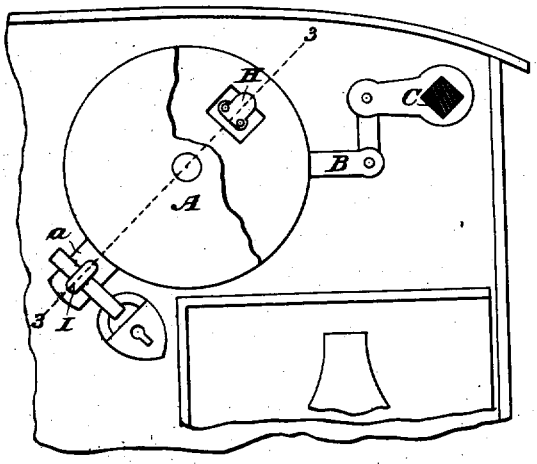
Figure 3:
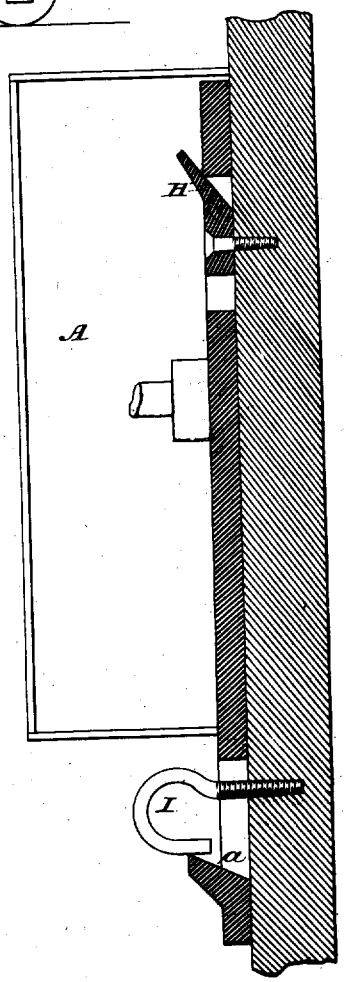
Figure 4:
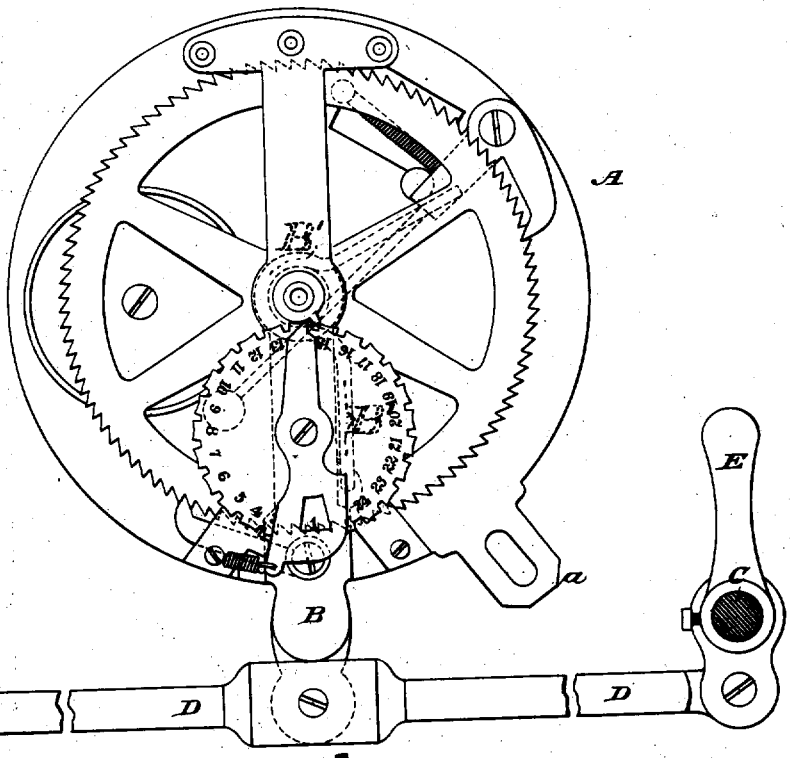
Figure 5:
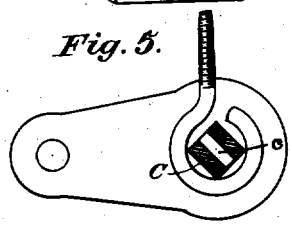
Figure 7:
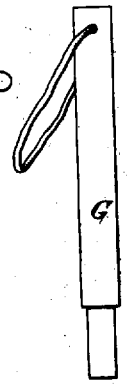
Figure 6:
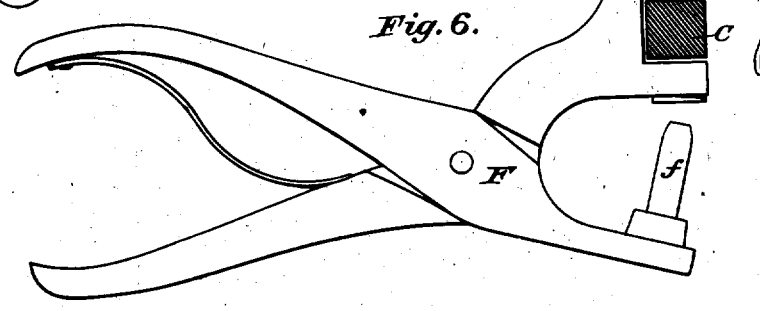

In the accompanying drawings, which show my improvements as embodied in the best way known to me at the date of filing my application for the original patent, Figure 1 is a longitudinal section through a horse-car, showing the position of the register and the operating-connections running through the car; Fig. 2, an inside view of the end of a car with the register in position and connected with the actuating devices. Fig. 3 is a sectional view, through the register-casing, on the line 3 3 of Fig. 2, showing the preferred manner of securing the register in place. Fig. 4 is a face view of an improved register of my invention, with a modification of the operating-connections. Fig. 5 is a cross-section of a portion of the operating-connections and an elevation of one of its supports; and Figs. 6 and 7 are implements carried by the conductor to actuate the register through its operating-connections from all parts of the car.

The registering-instrument A is preferably secured at one end of the car, as shown in Figs. 1 and 2.

The improved instrument illustrated in the drawings, Fig. 4, is of my own invention, and belongs to the class of duplex machines or registering machines which embody in their construction and organization two registering mechanisms, one for recording the number of fares collected on each separate trip, and adapted to be reset to zero or the starting-point at the commencement of a trip independently of the counting-actuator of the machine, and the other for recording continuously the fares collected on a large number of trips, the registers respectively being what are now called "trip" and "permanent" registers.

Inasmuch, however, as my improved register, *per se*, constitutes no part of this division of the reissue of my original patent, but, on the contrary, does constitute the subject-matter of another division (A) thereof, it is deemed unnecessary to describe it here in detail.

The actuator of the registering-machine A, as organized by me, is a pivoted lever, B, carrying a suitable pawl, which actuates the counting mechanism and sounds an alarm for each actuation of the register.

The actuator B of the registering-machine is connected by means of a pivotal or jointed connection (shown as consisting of a crank-joint) with a rod, C, extending preferably throughout the entire length of the car, so as to be accessible at all points. This rod C, which is supported by suitable bearings at proper distances apart, may be round or square, or of any such shape as will receive and be operated by an instrument carried by the conductor.

In Fig. 4 I have shown, in cross-section, two rods, C C, which are placed one on each side of the car, and pivoted to or connected by a crank-joint with a common cross bar or rod, D, arranged at right angles with the actuating-lever and jointed thereto. The rods, in this example, are shown as provided with suitable fixed handles E, mounted upon the rods at suitable distances apart, whereby the operation or turning of one of said handles communicates motion through the rod and its connections to the recording mechanism of the machine.

Inasmuch, however, as the plan shown in Fig. 4 is open in some degree to the objections and disadvantages incident to the use of the old strap or pull-cord arrangement, it is not a preferred organization as compared with the connections organized to be operated only by a detachable implement to be carried by the conductor.

A portable wrench, handle, or implement, to be temporarily placed on the rod to actuate the machine at any desired point along the length of the rod, is preferable to fixed handles, as without fixed handles the rod or connections and machine are less likely to be tampered with.

When the portable or detachable implement is used the conductor, after using it, removes it till he wishes to actuate the register again; and inasmuch as the connections cannot easily (and preferably not at all) be actuated without an implement, it will be obvious that all danger from the passengers operating the register, as they can easily do by a simple pull with the old strap arrangement, is avoided.

I have shown a rod as the connection to be operated by the detachable implement, and said rod is made to actuate the register by its rotation or by end movement, as may be most convenient. The rotary or rocking motion, however, is preferred.

Fig. 6 shows the application to the rod of a portable wrench, F, in the hand of the operator while working the registering-machine, while Fig. 7 shows a portable pin or lever, G, which serves to actuate the register by inserting it in one of a series of holes, *c*, formed in said rod at suitable distances apart, one of which is shown in cross-section in Fig. 5. The wrench, however, in the organization of connections shown, is preferred.

This wrench may, for some purposes, be provided with a punch, *f*, attached to it; or if suitable jaws are fitted upon any ordinary punch, such an instrument will conveniently answer the purposes of both punch and removable actuating implement for the register; also, to make one instrument serve for as many purposes as possible or necessary, shears and wrench may be in one piece, with or without a punch. Such a combined implement would be useful to cut or punch tickets, as it is usual to do when they are used on railroads.

After each actuation of the register, which, in the organization of connections shown, is effected by turning the rod in its bearings, so that its crank or connection will move the actuator or lever B, the operating-connection is returned to the proper position for a new actuation, and this is done automatically, preferably by the force or tension of a spring, B′, inclosed within the register-casing, and acting upon the actuator or lever B in a well-known way. The said operating-connection is moved to operate the register against the force or tension of the spring B′, and when the moving force has ceased or been removed the connection is thrown back to its normal position by reason of its connection with the actuating-lever.

I do not, of course, claim the peculiar organization by which the spring B′ is the medium for returning not only the actuator B, but the operating-connection also, to their normal position; but that is a preferred organization.

The register is preferably secured in place by means of the inclined hook or horn H, which enters an opening in the back of the register-casing, and by a staple, I, which passes through a slot in an ear or portion, *a*, of the casing. This manner of securing a register in place is not herein claimed, as it is not of my sole invention, being embodied in the Towle & Benton patent of April 27, 1875.

It will be observed that by the employment of the removable actuating implement or device shown in Fig. 7 I am enabled to operate a stationary fare-register by a connection extending through the car, adapted at particular points or places only in its length, at suitable distances apart, for the application of the removable operating implement, which organization, for some purposes, is very desirable.

I claim as my invention—

1. The combination, substantially as hereinbefore set forth, of a car or vehicle, a registering-machine fixed in said car or vehicle, a connection which is unadapted or incapable of being mechanically actuated directly by the hand, extending through the car for operating the register, in contradistinction to a common overhead strap for actuating a register, a removable implement or handle for mechanically actuating said operating-connection, and a device which automatically returns the operating-connection to its normal position, in readiness for a new actuation of the register by the detachable implement when applied to said connection.

2. The combination, substantially as hereinbefore set forth, of a stationary register mounted in a car or vehicle, a connection for actuating said register, extending through the car and rendered incapable of being readily actuated directly by hand, a pivotal or yielding joint between the said connection and said register, and a detachable implement to actuate the connection in working the register.

3. The combination, substantially as hereinbefore set forth, of a stationary register and a connection for operating said register, which extends through the car, and is adapted at particular points or places only in its length for the application of a removable implement carried by the conductor to work the register in the process of tallying the fares collected.

4. The combination, substantially as hereinbefore set forth, of a stationary register, a connection for operating said register, extending through the car, and adapted at particular points or places only in its length for the application of a removable implement, and a spring which returns said connection, when operated by the implement, to its normal position, to be again actuated in the process of registering the fares collected.

5. The combination, substantially as hereinbefore set forth, of a stationary register, a connection upon each side of the car for operating said register, and a portable or removable implement capable of application to the connection at either side of the car, to work the register from all parts of said car in which a fare may be collected.

6. The combination, substantially as hereinbefore set forth, of a register, a connection upon each side of the car and extending from end to end thereof, for operating said register, and a cross-bar or lever connected with said actuating-connections and with the register, whereby the register may be operated from either side of the car.

7. The combination, substantially as hereinbefore set forth, of the car, the stationary register, the rod-connection for operating said register, and the handles, placed at suitable distances apart, for operating said connection.

8. The combination, substantially as hereinbefore set forth, of the car, the register, the rod-connection for operating said register, the handles, placed at suitable distances apart, for operating said connection, and the spring to automatically return said connection to a position for a new actuation of the register when the strain upon the handle is removed.

In testimony whereof I have hereunto set my hand this 19th day of January, A. D. 1880.

JOHN B. BENTON.

Witnesses:
WM. S. BEAMAN,
ANTHONY GREF, Jr.